Aug. 3, 1937.   H. SCHOLLER ET AL   2,088,977
APPARATUS FOR REMOVING RESIDUES
Filed June 15, 1933   2 Sheets-Sheet 1
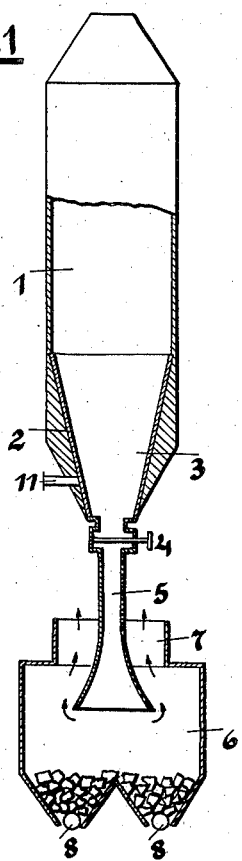
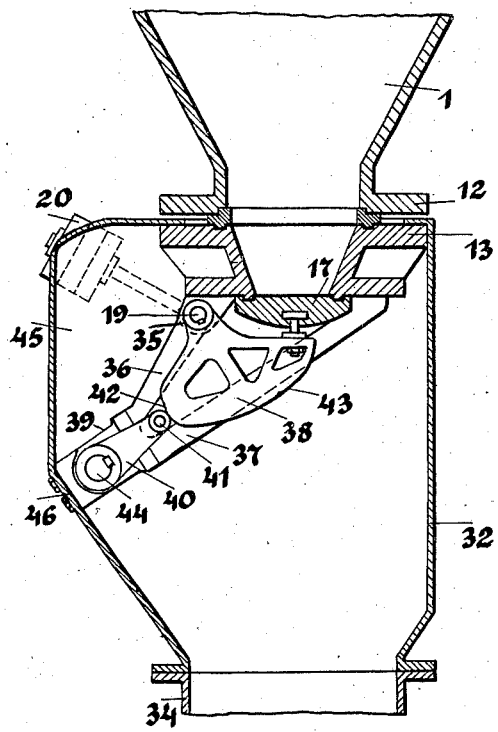
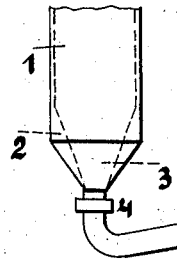
Heinrich Scholler and
Rudolf Eickemeyer
by Wm. S. Pritchard
Attorney

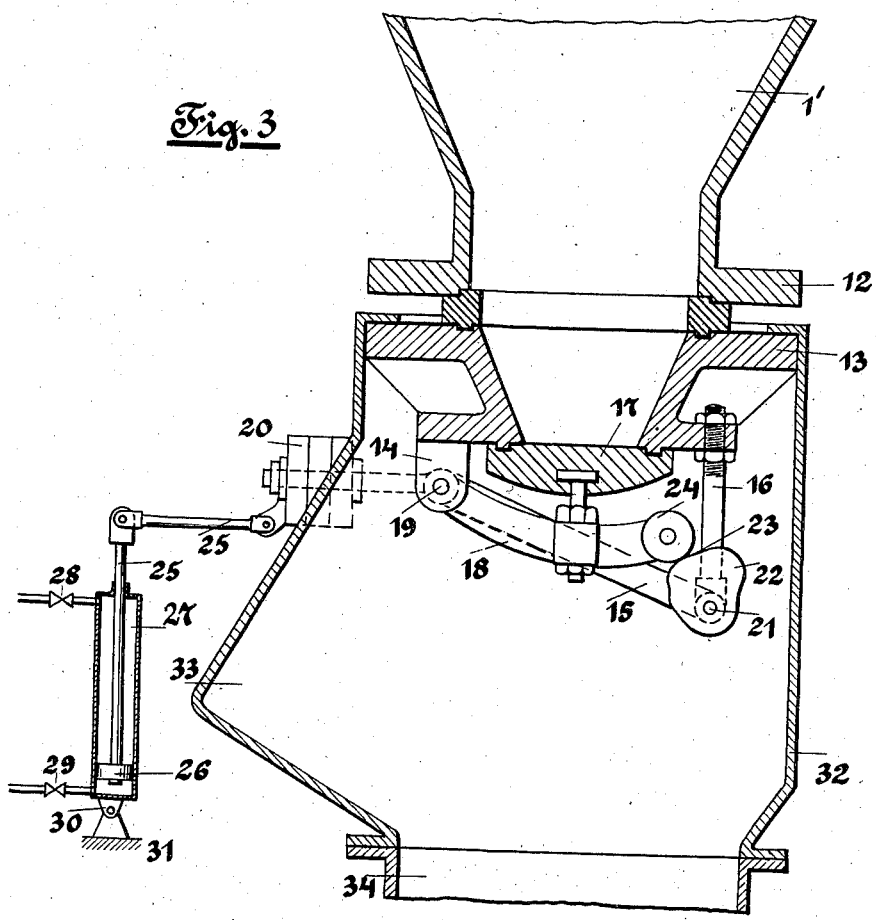

Patented Aug. 3, 1937

2,088,977

UNITED STATES PATENT OFFICE 2,088,977

APPARATUS FOR REMOVING RESIDUES

Heinrich Scholler and Rudolf Eickemeyer, Solln, near Munich, Germany

Application June 15, 1933, Serial No. 675,876
In Germany July 25, 1932

11 Claims. (Cl. 127—1)

This invention relates to the quick or easy removal of materials normally difficult to remove and/or normally requiring considerable time for the removal from apparatus in which said materials are formed.

In chemical reactions carried out on a large scale, solid residues in the form of hard cakes very often occur. The removal of these cakes from the container in which the reaction takes place is at times effected only with great difficulty. It the process of saccharification of cellulose, such as disclosed in United States Patent No. 1,890,304, there results a hard cake of lignin or lignin-like material, hereafter for brevity and convenience called lignin, and which is more or less conjoined and which becomes particularly hard when the liquid flows through the container, i. e., percolator, from top to bottom. It is absolutely impossible to force out or clear out this cake of lignin. Heretofore in the industrial saccharification of cellulose, it was necessary either to reduce the cake into small pieces by the aid of strong drills or to remove it by manual labor. This work was tedious and usually required a period of several hours, such as 5 or more hours.

We have found that we can shorten the process of removing the lignin from the percolator to a relatively short period of time, such as a few minutes, by suddenly opening the percolator, which is maintained under pressure and at an elevated temperature, at suitable places, thereby suddenly releasing the pressure therein. As a consequence, the cake is disrupted and broken into small pieces. The steam may be utilized in some instances to remove the broken lignin mass. Wherever this is not possible, the broken mass may be quickly and readily removed in any suitable manner. When the pressure in the percolator is released in such a manner that the steam is suddenly released simultaneously above and below the lignin cake, the latter is broken into small pieces by the sudden evaporation of the water content thereof.

It is, therefore, an object of this invention to provide an easy and quick method of removing residue in the form of a hard cake, and which remains in the apparatus in which the reaction has been carried out, by suddenly releasing the pressure within said apparatus.

Another object of this invention is to provide an apparatus for carrying out the aforementioned process.

Other objects will appear from the following description, appended claims and accompanying drawings wherein:

Figure 1 illustrates a longitudinal section through a percolator equipped with means wherein the pressure within said percolator may be quickly and suddenly reduced.

Figure 2 is a modified form of apparatus illustrating an embodiment wherein the steam serves to eject and convey the broken lignin cake.

Figure 3 is a section through the lower part of the percolator, provided with a closing appliance.

Figure 4 is another form of moving device of the closing appliance.

The invention will be explained with reference to the removal of the lignin in the saccharification of cellulose. It is to be understood, however, that the invention is not limited to the removal of lignin alone but can be applied with equal success to the removal of other hard residues or residues difficult to remove, such as remain behind in containers in which the chemical reaction is carried out.

Referring now to the drawings wherein like reference numerals designate like parts, and particularly Figure 1, wherein one embodiment of an apparatus for carrying out the instant invention is shown, the reference numeral 1 designates a percolator used in the saccharification of cellulose which is provided with a pipe at the top thereof (not shown), whereby the dilute acid under pressure and at an elevated temperature is introduced. It is furthermore provided with means (not shown) in the lower portion whereby the sugar solution may be drawn off. The percolator has a capacity of approximately 20,000 liters and in the saccharification process the reaction in the percolator is maintained at a temperature of approximately 170° C. and a pressure of 7.5 atmospheres. In such a percolator the lignin cake constituting the residue weighs approximately 2 to 3 tons and at the temperature and pressure conditions within the container has a water content of about 50%–70%. The percolator is provided in its lower portion with a brick work and a filter 2, so that a rather pointed cone 3 is formed leading to a valve, preferably a slide valve 4, which in the present embodiment is utilized for suddenly releasing the pressure within the percolator. Upon the sudden opening of the valve 4, the pressure within the percolator is lowered and this at first in the immediate proximity of the valve, so that according to the release of pressure, the water evaporates partly in an explosive manner and breaks the lignin cake into small pieces. This, upon mixture with the steam developed, passes out through the valve.

The opening of the valve has a diameter of 150 mm. and is smaller than one-fifth of the cross-section of the percolator usually termed "percolator pipe".

The steam developed by the sudden release of pressure, in addition to breaking the residue into small pieces, may be used to remove the broken mass from the percolator. In Figure 1 the steam aids in forcing the broken mass from the percolator and conducts it through an exhaust pipe 5, preferably conical in shape, as shown, and having one end cooperatively connected with the valve. The flared end in this embodiment projects into a chamber 6 which is provided with an opening 7 through which the steam is permitted to escape. It is, of course, understood that the steam passing from the chamber 6 may be conveyed to any suitable place where it may be utilized to further advantage. The broken particles of lignin drop to the bottom of the chamber 6 and from there they are removed. The bottom of the chamber 6 may be provided with any suitable means for permitting the withdrawal of the broken mass. In the specific form shown, the bottom of the chamber 6 is formed to constitute a plurality of troughs or hoppers, the exit of the mass therefrom being controlled by a suitable mechanism, such as screw conveyers 8.

When the broken lignin is desired to be conveyed from the percolator directly to some other place where the lignin may be utilized for some purpose or other, one end of a conduit, such as an inclined pipe 9, may be connected to the valve 4, the other end thereof being connected to the desired place where the broken mass is to be delivered. In Figure 2 the reference numeral 10 designates a chamber, such as a boiler house, where the lignin can be used for fuel after the separation from the steam. In this embodiment, the steam developed by the release of pressure within the percolator 1 conveys and transports the broken lignin mass through the pipe 9 to the chamber 10.

The percolator is preferably provided with a filter pipe 11 which is slightly opened during the explosion, so that some steam or liquid may pass through the filter 2. By this means the filter 2 is closely pressed against the surrounding wall and its separation, in consequence of the explosion, is avoided.

Referring now to Figure 3 wherein another embodiment of an apparatus for carrying out the invention is disclosed, the reference numeral 1' designates the lower end of a percolator 1 of the same general type above described and which is provided with a flange 12 and an intermediate flange 13 on which there is disposed a bearing 14 with a tie rod 15 and opposite adjustable bearing bolts 16. A cover plate 17 designed and constructed, for example, as shown, so that it will tightly close the opening in the bottom of the percolator, is secured in any suitable manner to a lever 18, one end of which is securely fixed to a shaft 19 mounted in the bearing 14. A counterweight 20 is carried on one end of a supporting rod, the other end of which is fixed to the shaft 19, for reasons which will become apparent. The bearing bolts 16 are provided, as shown, with a shaft 21 on which an eccentric 22 having a cam surface 23 is fixed. The shaft 21 may be rotated in any suitable manner, such as by a worm gear with a hand wheel or other suitable mechanism, not shown in the drawings. On the free end of the lever 18 there is provided a roller 24 which cooperates with and lies on the eccentric 22. The bearings of the shaft 21 are fixed and strengthened by the two bearing bolts 16 and the tie rod 15.

The counterweight 20 is connected with a plunger 26 through levers 25. The plunger 26 is adapted to reciprocate in a cylinder 27 and constitutes an air brake, the action of which is regulated by valves 28 and 29. The air brake mechanism is suitably mounted, as indicated by the reference numeral 30, on an appropriate fixed support 31. A protecting box 32 possessing a curvature for the reception of the cover in an open state is also provided. This box is provided with a closable man-hole, not shown in the drawings, and also with an exhaust pipe 34 for the removal of the residue. It is to be noted that the counterweight 20 is disposed on the outside of the box 32.

This device is operated as follows—upon rotation of the shaft 21 by any suitable mechanism in a counter-clockwise direction, the eccentric 22 cooperating with the roller 24 causes the cover plate 17 to press against the opening of the percolator, whereby the cover plate 17 is closed against the over-pressure inside the percolator. When the shaft 21 is rotated in the opposite direction, the new position of the eccentric does not hold the roller 24 in place. As a consequence and because of the over-pressure existing within the percolator, at the desired moment the cover plate 17 is suddenly opened. The counterweight and the air brake mechanism take up the recoil of the cover plate when the pressure within the container forces it outwardly. It is to be noted that the braking mechanisms 20, 26 and 27 also serve to maintain the cover plate in locked position.

The advantage of the foregoing method of closing lies in the fact that first it permits the necessary powerful and impulsive action of the closing mechanism, this being necessary to hold up the excessive over-pressure and, secondly, it guarantees the sudden release of pressure without exposing the device itself or any auxiliary arrangements to damage.

Referring now to Figure 4, wherein a modified form of opening and closing the percolator is illustrated, it will be noted that the cover plate 17 is secured to an eccentric 38 which is rotatably mounted on the shaft 19. The eccentric 38 is provided with a cam surface 42 and a braking surface 43 which cooperate with a roller 41 carried on the lever 40, the latter being carried on a shaft 44 rotatably mounted on a bearing 39 which is suitably anchored, such as by means of bolts 36 and 37.

As in the previous modification, there is provided a protecting box 32. This box is fitted at 45 with a curvature for the reception of the cover plate when in open position. It is to be noted that the box 32 is rigidly secured at 46 to the bearing 39. A stopping device, such as a latch, may be provided to maintain the cover plate in open position.

The device just described operates as follows— upon rotation of the lever 40 in a clockwise direction with the aid of any suitable driving mechanism for the shaft 44, for example, a self-locking worm gear (not shown in the drawings), the cover plate 17 is pressed rigidly against the opening of the percolator and is held firmly closed against the over-pressure in the interior of the container. Upon rotation of the shaft 44 in a counter-clockwise direction, the roller 41 travels from the cam surface 42 onto the surface 43. As a consequence, the force which holds the cover plate in closed position is removed and the pressure within the percolator forces the said cover plate from its closed position. The roller 41, riding on the surface 43, causes a braking effect. It is to be understood that the eccentric 38 is so designed and arranged that, upon opening of the cover plate, the space beneath the outlet is free from obstructions.

It is to be understood that this modification is not restricted to the precise details described, since it is possible to secure the same result with the aid of a strong spring which tends to turn the shaft 44 in a clockwise direction. The braking effect may also be produced on the shaft 19 in any suitable manner. This braking effect may be produced by friction or air-brake, or the like, or a combination thereof, as, for example, that described in the previous modification.

The outlet in the bottom of the percolator 1 is less than one-fifth of the cross-section of the percolator pipe, though it may be made of any other size, as desired.

In addition to the advantages described above, the instant invention also serves to reduce the quantity of moisture in the cake by about one-seventh of its moisture content. This is very desirable when the lignin is to be dried prior to use.

Since it is obvious that various changes and modifications may be made in the above description without departing from the nature or spirit thereof, this invention is not restricted thereto except as set forth in the appended claims.

We claim:

1. An apparatus comprising a container in which a solid residue is formed, a filter in the lower portion of said container, means to maintain the interior of said container under a high pressure and at an elevated temperature, means to suddenly reduce the pressure within the container whereby the residue is broken into pieces, permitting easy removal, and means cooperating with said filter to inhibit separation of said filter from said container at least during the sudden reduction of pressure within the container.

2. An apparatus comprising a container in which a solid residue is formed, a filter in the lower portion of said container, means to maintain the interior of said container under a high pressure and at an elevated temperature, a steam exhaust valve adjacent the bottom of said container to suddenly reduce the pressure within the container whereby the residue is broken into pieces, permitting easy removal, and means cooperating with said filter to inhibit separation of said filter from said container at least during the sudden reduction of pressure within the container.

3. An apparatus comprising a container in which a solid residue is formed, a filter in the lower portion of said container, means to maintain the interior of said container under a high pressure and at an elevated temperature, a steam exhaust valve adjacent the bottom of said container to suddenly reduce the pressure within the container whereby the residue is broken into pieces, means cooperating with said filter to inhibit separation of said filter from said container at least during the sudden reduction of pressure within the container, and means connected to said valve to direct the broken mass in its passage from the container.

4. An apparatus for the saccharification of cellulose comprising a container in which a solid residue is formed and having an outlet in the bottom thereof, said container being provided with means to maintain the interior of said container under a high pressure and at an elevated temperature, a filter in the lower portion of said container, a hinged cover plate adapted to tightly close said outlet, and means to lock said cover plate in closed position, said cover plate being adapted to be suddenly opened upon the release of the locking means, whereby the pressure within the container is suddenly reduced and the residue broken into pieces, and means cooperating with said filter to inhibit separation of said filter from said container at least during the sudden reduction of pressure within the container.

5. An apparatus for the saccharification of cellulose comprising a container in which a solid residue is formed and having an outlet in the bottom thereof, said container being provided with means to maintain the interior of said container under a high pressure and at an elevated temperature, a hinged cover plate adapted to tightly close said outlet, and eccentric means to lock said cover plate in position, said cover plate being adapted to be suddenly opened by the pressure within the container upon the release of the locking means whereby the pressure within the container is suddenly reduced and the residue broken into pieces, and means cooperating with said filter to inhibit separation of said filter from said container at least during the sudden reduction of pressure within the container.

6. An apparatus for the saccharification of cellulose comprising a container in which a solid residue is formed and having an outlet in the bottom thereof, said container being provided with means to maintain the interior of said container under a high pressure and at an elevated temperature, a hinged cover plate adapted to tightly close said outlet, means to lock said cover plate in closed position, said cover plate being adapted to be suddenly opened upon the release of the locking means, whereby the pressure within the container is suddenly reduced and the residue broken into pieces, and means to brake the rapidity of movement of said cover plate after the opening thereof.

7. An apparatus for the saccharification of cellulose comprising a container in which a solid residue is formed and having an outlet in the bottom thereof, said container being provided with means to maintain the interior of said container under a high pressure and at an elevated temperature, a hinged cover plate adapted to tightly close said outlet, eccentric means to lock said cover plate in position, said cover plate being adapted to be suddenly opened by the pressure within the container upon the release of the locking means whereby the sudden release of the pressure within the container breaks the residue into pieces, and means to brake the rapidity of movement of said cover plate after the opening thereof.

8. An apparatus for the saccharification of cellulose comprising a container in which a solid residue is formed and having an outlet in the bottom thereof, said container being provided with means to maintain the interior of said container under a high pressure and at an elevated temperature, a cover plate to close said outlet, a hingedly mounted lever cooperating with said cover plate, an eccentric mechanism cooperating with said lever, and braking means cooperating with said lever.

9. An apparatus for the saccharification of cellulose comprising a container in which a solid residue is formed and having an outlet in the bottom thereof, said container being provided with means to maintain the interior of said container under a high pressure and at an elevated temperature, a cover plate to close said outlet, a pivotally mounted eccentric mechanism having a cam surface and a braking surface cooperating with said cover plate, and means cooperating with said eccentric to close and release the cover plate.

10. An apparatus comprising a container in which a solid residue is formed, a filter in the lower portion of said container, means to maintain the interior of said container under a high pressure and at an elevated temperature, means to suddenly reduce the pressure within the container whereby the residue is broken into pieces, permitting easy removal, means cooperating with said filter to inhibit separation of said filter from said container at least during the sudden reduction of pressure within the container, means to guide the broken mass from said chamber, and means to separate the steam from the broken mass.

11. An apparatus comprising a container in which a solid residue is formed, a filter in the lower portion of said container, means to maintain the interior of said container under a high pressure and at an elevated temperature, a steam exhaust valve adjacent the bottom of said container to suddenly reduce the pressure within the container whereby the residue is broken into pieces, permitting easy removal, means cooperating with said filter to inhibit separation of said filter from said container at least during the sudden reduction of pressure within the container, means to guide the broken mass from said chamber, and means to separate the steam from the broken mass.

HEINRICH SCHOLLER.
RUDOLF EICKEMEYER.